Patented Dec. 30, 1952

2,623,827

UNITED STATES PATENT OFFICE 2,623,827

BALL POINT PEN INK

Anthony Manuel Moos, New York, N. Y., assignor to Eversharp, Inc., Chicago, Ill., a corporation of Delaware No Drawing. Application April 23, 1948, Serial No. 22,960

2 Claims. (Cl. 106—23)

This invention has to do with a normally solid ink composition adapted for use in stick or other form in the reservoir of a writing implement having a metering tip containing a rotatably mounted ball at one end, which composition has the property of converting to a locally fluid dispersible state upon frictional contact with the ball as the ball turns, whereby the fluid can be metered by the ball to a writing surface.

In application Ser. No. 769,494, filed August 19, 1947, in which I am one of the applicants, such a composition is disclosed, together with a writing implement of the ball point type adapted for use in conjunction therewith.

The term "normally solid" as used herein is intended to embrace within its meaning either a hard state, a soft mushy state, or some intervening state. It is not to be construed as including a fluid state. Nor is it to be construed as including, at the other limit, such a rigid state as would preclude the conversion referred to above.

The new ink composition preferably should have such physical characteristics that it will not flow appreciably when confined in a mass or stick form under pressure in a pen reservoir, other than possibly to conform itself initially to the space in which confined, and yet it must not be so unimpressionable that it will not convert locally to a fluid state upon frictional or shearing contact with the rear surface of the writing ball or other transfer element.

In its preferred form such an ink composition may be described as an emulsion of normally non-fluid character. Such an emulsion can be provided by combining certain ingredients that will produce a composition having an external phase and an internal phase. A suitable dye should be selected for the external phase, and another suitable material, which will be insoluble in the external phase, should be selected for the internal phase.

Preferably, the external phase is composed of an acid salt of a basic dyestuff, in which the acid is an aliphatic fatty acid such as, for example, oleic acid, although other higher or lower fatty acids can be used. However, such acids should be restricted in carbon numbers which fall within a range of 10 to 20. Victoria Blue oleate is a specific example of an acid salt of a basic dyestuff. It is water insoluble and therefore preferable as a dyestuff but such a characteristic is not essential. Other such basic dyestuffs which can be utilized are any of the Victoria Blue bases, Victoria Green bases, Rhodamine bases, Gentian Violet bases, and the like.

In preparing the external phase of such a composition, water insoluble components other than the aliphatic fatty acid salts of basic dyestuffs can be used. For example, the fatty acid esters of ethylene glycol, propylene glycol, and other polyethylene glycols can be substituted if they are suitably dyed with a fat or oil soluble dyestuff, such as, for example, Alizarine Irosol base.

The acid salts of the basic dyestuffs are preferred, however, because of their insolubility. They are good lubricants, not subject to oxidation or atmospheric deteriorization, and have desirable penetrating characteristics.

The internal phase contemplates a wax-like material which is a polyethylene glycol or, more specifically, a polyoxyethylene glycol which is chosen from among the group of ethylene oxide polymers having a molecular weight of about 400 to 16,000. Such materials are sold under the trade name of Carbowax by Carbide & Carbon Chemical Corp. Polyoxyethylene glycols having molecular weights falling within a range of about 1000 to 6000 are considered preferable for certain types of ink compositions herein disclosed.

Preferably, such a solid emulsion type of ink composition includes a third or solid phase which can be provided by a suitably selected pigment. The pigment will impart to the composition such characteristics as greater light fastness and permanency, and will aid in controlling the stability of the composition by enabling it more readily to enter into the disperse or fluid state upon frictional engagement with another surface such as a rotatable ball. Such pigments may be chosen from either the inorganic or the organic fields. Some preferred inorganic pigments are the iron blues or the ultra-marine blues. Some preferred organic pigments are the phospho-tungstic blue toners or the phthalocyanine blues such as monastral blue.

When a pigment is used it is desirable to insure proper distribution thereof within the external and internal phases. In such case the addition of a surface active agent is recommended. Among the preferred surface active agents which can be selected are those which are non-ionic in character, such as, for example, the polyoxyalkylene oxides of fatty acid esters of the poliols (polyhydric alcohols). These, in effect, are wetting agents and care should be taken to select one which definitely is neither cationic or anionic. A suitable compound falling within this classification is Tween 20, manufactured by the Atlas Powder Company. Tween 20 is described by the manufacturer as a polyoxyalkylene oxide of sorbitol monolaurate.

The consistency of the internal phase in certain preferred formulations can be modified by adjusting the ratios of higher and lower molecular weights of the polyoxyethylene glycols.

Examples of ink compositions embodied in the present invention which has the desired properties hereinbefore described are as follows:

*Example 1*

| | Per cent |
|---|---|
| Victoria Blue oleate (external phase) | 56 |
| Carbowax 1500 (8%) mixed with polyoxyethylene glycol 400 (7%) (internal phase) | 15 |
| Victoria Blue phospho-tungstic toner (pigment) | 27 |
| Tween 20 (surface active agent) | 2 |

The range of ingredients for a composition of the foregoing type preferably fall within the following limits: External phase 40% to 85%; internal phase 3% to 30%; pigment 10% to 45%; surface active agent 0.5% to 5%.

The foregoing is a specific example of a preferred formulation of an emulsion type of ink composition.

*Example 2*

Other solid ink compositions of the emulsion type can be manufactured by forming emulsions that are solid at ordinary room temperatures in which the external phase is water insoluble and in which the internal phase is water soluble. The external phase is first dyed with a water insoluble dye or pigment and the internal phase is dyed with a water soluble dye. These ingredients, after emulsification at temperatures preferably over 55° C. are allowed to cool, under constant stirring, and then permitted to solidify.

For the external phase, water insoluble but organic solvent soluble compounds such as paraffin wax, chlorinated paraffins, beeswax, and polyethylene wax compositions, either alone or in mixtures, may be used if desired.

For the internal phase, polyoxyethylene glycols or equivalent water soluble glycols or water soluble alcohols with low vapor pressure such as, for example, 2-methyl-2-4 pentanediol, or mixtures thereof may be used.

In the external phase either a pigment or an oil soluble dye can be used while in the internal phase a water soluble or spirit soluble dye is preferably used.

Emulsification of the two phases is brought about with the use of properly selected emulsifiers.

Preferred examples of emulsifiers for use in compositions of this type are polyoxyalkylene sorbitol or manitol, fatty acid esters having carbon chain lengths between 12 to 18, as well as emulsifiers adaptable for promoting oil and water emulsions such as the heavy metal soaps of fatty acids or cholesterol derivatives.

As to the preferred range of ingredients given in this example, those in the external phase fall between 55 to 90% and those in the internal phase fall between 45 to 5%, emulsifiers between 1 to 15%, pigment or oil soluble dyes between 1 to 10%, and water soluble or spirit soluble dyes between 1 to 10%.

The following are types of ingredients which can be used in preparing emulsion types of ink composition, listing specified weights and functions:

Paraffin wax, 50 grams (for bodying the external phase)
Cetylpalmitate, 10 grams (as a bodying agent)
Cetyl alcohol, 1 gram (as a lubricant)
Sorbitol monostearate, 5 grams (as an emulsifier)
Sorbitanpalmitate, 5 grams (as an emulsifier)
Ethylene glycol, 10 grams (to retard water evaporation)
Water, 13 grams
Water soluble dye, 3 grams
Oil soluble dye, 3 grams The following list sets forth percentage compositions of the same or similar ingredients with functions:

Paraffin wax, 45% (for bodying the external phase)
Carnauba wax, 1% (for bodying the external phase)
Petrolatum USP, 1% (as a lubricant for external phase)
Cholesterol, 5% (as an emulsifier)
Manitol monoleate, 10% (as an emulsifier)
Triethylene glycol, 10% (solvent internal phase)
Oil soluble dye, 5%
Water soluble dye, 5%
Water q. s., 100%

Emulsion types of such compositions may be manufactured by mixing the oil phase together with the dye and melting the same at 65° C. The water soluble dye, glycol, and water are heated to the same temperature. The water soluble phase is added to the oil phase under constant stirring.

The product is then passed through a colloid mill operating at a temperature of about 55° C. The composition of matter is then allowed to cool to about 45° C., at which temperature it may be cast into molds if desired or it may be immediately placed into the reservoir of a writing implement of the ball point type.

Compositions of matter such as those above described have unique physical characteristics and properties. For example, they yield self-supporting structures, the water soluble dyestuffs are within the internal phase, and the emulsion breaks down leaving a composite film of oil and water during the process of rubbing these compositions of matter across paper or other suitable writing surfaces. The written mark resulting from this action is similar or identical to that made by liquid ink. The properties of these compositions of matter permit their use in other entirely novel types of writing instruments or as self-supporting refillable units for the ball point type of pen.

*Example 3*

Another composition of matter which will provide such an ink stick having characteristics similar to those obtained in the foregoing examples is one in which a suitable dye is mixed with water miscible polymerized glycol such as polyoxyethylene glycol (Carbowax). Preferably, such a material as the latter should have a molecular weight falling within a range of about 1000 to 16,000, i. e. one which has a melting point of about 35° C. to 62° C. Suitable dyes can be selected from the following group:

Basic or alkaline;
Pigments (insoluble) as carbon black, lithol red, chrome yellow, and iron blue;
Water soluble dyestuffs, such as methyl violet, malachite green, or erosine;
Spirit soluble dyestuffs, such as the Luxol, Azosol and Rhodamine types; and
Oil soluble dyestuffs.

When a basic or alkaline type of dye is used it should first be mixed with an acid selected from either the mineral or the fatty acids. In the latter case lauric, palmitic or stearic acid is preferable, or any of the other acids having carbon linkages from 10 to 20. With dyestuffs or pigments which are insoluble in Carbowax a suitable dispersing agent should be used, such as, for example, polyoxyethylene glycol monostearate, dodecylamine, cetyl trimethyl ammonium bromide, sodium salt of cetyl alcohol sulphonate, or dioctyl sodium sulfo succinate.

In preparation, one of the chosen dyes and the selected polymerized glycol, including fatty or mineral acids, and wetting agents when necessary, are heated, thoroughly stirred and allowed to cool. Solid ink sticks may be cast by pouring the liquid into molds or by extrusion.

Example 4

Another composition of matter which will provide such an ink stick is one in which a suitable dye is mixed with a water miscible polymerized glycol such as polyoxyethylene glycol (Carbowax), a fatty acid amide such as octadecylamide and a water soluble glycol of low molecular weight such as propylene glycol, and a formaldehyde phenol condensation product such as a Bakelite resin and a detergent or a dispersant of the anionic, cationic or non-ionic types.

The polyoxyethylene glycol is chosen from among those whose molecular weights fall within a range of about 1000 to 16,000 or which have melting points between 35° C. to 62° C. The fatty acid amide is chosen from among the group of saturated fatty acid amides having carbon chains between 12 to 20. The low molecular weight water soluble glycol is chosen from the group of dihydric glycols such as ethylene glycol or propylene glycol or from the group of triols such as glycerine, or from the group of hexols such as sorbitol or manitol, etc. Suitable dyes can be selected from the following groups:

Basic or alkaline pigments such as carbon black, lithol red, chrome yellow and iron blue;
Water soluble dyestuffs such as malachite green;
Spirit soluble dyestuffs such as the Luxol Azosol types;
Oil soluble dyestuffs such as the lauric acid salt of Victoria Blue dye.

When a basic or alkaline type of dye is used, it is first mixed with an acid selected from either the mineral or organic groups. In the latter group the lauric or palmitic and stearic acids are preferable, or any monocarboxylic acid having a carbon chain length between 10 to 20.

When using dyestuffs or pigments which are insoluble in the preferred composition of matter, a suitable dispersing agent can be used, such as, for example, polyoxyethylene glycol monostearate, dodecylamine hydrochloride or acetate, cetyl trimethyl ammonium bromide, the sodium salt of cetyl alcohol sulphate, or dioctyl sodium sulfo succinate.

In the preparation of these ink sticks a mixture of dyestuffs, the organic or mineral acid if the dyestuff belongs to the basic group, the water soluble glycol, the wetting or dispersing agent, the bodying agents such as the fatty acid amide or the phenol formaldehyde resin are thoroughly mixed and heated to liquefaction, stirred and poured into molds and allowed to cool. Another preferred method of manufacture consists in making an intimate mixture of the necessary ingredients and extruding this mixture through a standard extrusion machine.

The following list gives preferred ranges of ingredients which constitute such a composition:

Fatty acid amide—between 1 to 40%;
Dyestuff—between 2 to 25%;
Fatty acid required when using basic dyestuff—between 6 to 40%;
Low molecular weight, water soluble glycol—between 1 to 20%;
Polyoxyethylene glycol of high molecular weight—between 10 to 75%;
Wetting agent or detergent—between 1 to 5%;
Phenol formaldehyde resin—between 2 to 10%.

The following list sets forth parts by weight of ingredients in such a composition:

Octadecylamide—14 parts by weight;
Propylene glycol—10 parts by weight;
Lauric acid salt—Victoria Blue—36 parts by weight;
Carbowax 6000—48 parts by weight;
Carbowax 1000 monoleate—2 parts by weight In preparing and manufacturing such ink sticks, the fatty amide, propylene glycol and lauric acid are mixed and melted. The Victoria Blue, propylene glycol and the Carbowax monoleate are then added. The mixture is allowed to cool under constant stirring until a temperature of 45° C. is reached, at which point it is poured into molds and cast into rods.

The following list of ingredients of a composition is given:

Victoria Blue Laurate—32 parts by weight;
Propylene glycol—8 parts by weight;
Carbowax 600—32 parts by weight;
Aerosol OT (100%), sodium salt of dioctyl sulfo succinic acid—20 parts by weight.

The method of preparation is identical to that set forth in the preceding examples.

The following list of ingredients of a composition is given:

Carbowax 6000—55 parts by weight;
Bakelite resin—3 parts by weight;
Victoria Blue oleate—25 parts by weight;
Luxol Blue—8 parts by weight;
Azosol Blue—8 parts by weight;
Propylene glycol—10 parts by weight.

The method of preparation is identical to that set forth in the previous examples.

Compositions of matter prepared according to these examples are solids melting at temperatures higher than 35° C. and preferably falling within a range of 35° C. to 60° C.

The new ink composition may be preformed before use into a stick-like shape for ready insertion in the reservoir of the pen, or it initially may be molded into the reservoir to conform to the shape of the latter. As used in the reservoir it need not necessarily constitute a single coherent charge, but might be made up of a plurality of individual pellet-like charges, or might even be used in more or less initially non-coherent bulk form such as, for example, in the form of discrete particles which individually have the characteristics of the single charge or mass.

Since certain changes may be made in the above composition of matter and different embodiments of the invention could be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly, it is to be understood that in the claims, ingredients or compounds recited in the singular are intended to include compatible mixtures of such ingredients wherever the sense permits.

Having described my invention what I claim as new and desire to secure by Letters Patent is:

1. A normally thixotropic solid ink composition adapted for use in stick form in the reservoir of a writing implement having a dispensing tip containing a rotatably mounted ball at one end, which composition has substantially the following formulation in per cent by weight:

| | Per cent |
|---|---|
| Oleic acid salt of basic dyestuff (external phase) | 56 |
| Polyoxyethylene glycol, average molecular weight 400 to 1600 (internal phase) | 15 |
| Pigment (solid phase) | 27 |
| Non-ionic surface active agent | 2 |

2. A normally thixotropic solid ink composition adapted for use in stick form in the reservoir of a writing implement having a dispensing tip containing a rotatably mounted ball at one end, which composition is composed essentially of from 40 to 85% by weight of an external phase containing as the essential ingredient thereof an aliphatic fatty acid salt of a basic dyestuff, from 3 to 30% by weight of an internal phase which consists essentially of polyoxyethylene glycol having a molecular weight of 400 to 16,000 that is insoluble in the external phase, and from 10 to 45% by weight of a solid phase consisting of a pigment, the composition having the property of converting to a locally fluid dispersible state upon frictional contact with the ball as the ball turns, whereby the fluid can be dispensed by the ball to a writing surface.

ANTHONY MANUEL MOOS.

REFERENCES CITED

The following references are of record in the file of this patent:

UNITED STATES PATENTS

| Number | Name | Date |
|---|---|---|
| 437,780 | Higgins | Oct. 7, 1890 |
| 2,079,229 | Schrauth | May 4, 1937 |
| 2,138,836 | Brower | Dec. 6, 1938 |
| 2,302,760 | Goodman | Nov. 24, 1942 |
| 2,427,921 | Pfaelzer | Sept. 23, 1947 |

OTHER REFERENCES

"Surface Active Agents," Young et al., 1945, page 92.

"Synthetic Organic Chemicals," Carbide & Carbon Chem. Corp., July 1945, page 23.

"Carbowax Compounds and Polyethylene Glycols," Carbide & Carbon Chem. Corp., June 30, 1946, pages 4 and 5.